US009036163B2

(12) United States Patent
Tian et al.

(10) Patent No.: US 9,036,163 B2
(45) Date of Patent: May 19, 2015

(54) METHODS AND APPARATUSES FOR DISPLAYING TEXT BLOCK AND PROCESSING TEXT BLOCK

(71) Applicants: PEKING UNIVERSITY FOUNDER GROUP CO., LTD., Beijing (CN); FOUNDER INFORMATION INDUSTRY HOLDINGS CO., LTD., Beijing (CN); BEIJING FOUNDER ELECTRONICS CO., LTD., Beijing (CN)

(72) Inventors: Yu Tian, Beijing (CN); Meng Lang, Beijing (CN); Lei Tan, Beijing (CN)

(73) Assignees: PEKING UNIVERSITY FOUNDER GROUP CO., LTD., Beijing (CN); FOUNDER INFORMATION INDUSTRY HOLDINGS CO., LTD., Beijing (CN); BEIJING FOUNDER ELECTRONICS CO., LTD., Beijing (CN)

( * ) Notice: Subject to any disclaimer, the term of this patent is extended or adjusted under 35 U.S.C. 154(b) by 0 days.

(21) Appl. No.: 14/095,502

(22) Filed: Dec. 3, 2013

(65) Prior Publication Data
US 2015/0036154 A1 Feb. 5, 2015

(30) Foreign Application Priority Data

Aug. 5, 2013 (CN) .......................... 2013 1 0336633

(51) Int. Cl.
G06K 15/02 (2006.01)
G06F 3/12 (2006.01)
G06K 15/00 (2006.01)

(52) U.S. Cl.
CPC .......... *G06F 3/1256* (2013.01); *G06K 15/1802* (2013.01)

(58) Field of Classification Search
CPC .............. G06K 15/00; G06K 15/1276; G06K 15/1802; G06K 15/1815; G06K 15/1827
USPC ............. 358/1.1, 1.11, 1.13, 1.14, 1.15, 1.18; 382/174, 197, 276; 345/428, 470; 709/201, 203, 207
See application file for complete search history.

(56) References Cited

U.S. PATENT DOCUMENTS

| 8,416,244 B2 * | 4/2013 | Cornell ......................... 345/467 |
| 2006/0146059 A1 * | 7/2006 | Inoue et al. ................... 345/546 |
| 2007/0009179 A1 * | 1/2007 | Easwar ......................... 382/276 |
| 2012/0324341 A1 * | 12/2012 | Dejean .......................... 715/243 |

* cited by examiner

Primary Examiner — Gabriel Garcia
(74) Attorney, Agent, or Firm — Workman Nydegger

(57) ABSTRACT

The invention discloses a method for displaying a text block, a method for processing a text block, a client and a server, where the method for displaying a text block includes the steps of: a client collecting font parameters and layout parameters of a text block; the client transmitting the font parameters and the layout parameters of the text block to a server; and the client receiving vector description information of the text block, generated according to the font parameters and the layout parameters of the text block, sent from the server and executing drawing commands to draw the text block and display the text block on a screen. With embodiments of the invention, the effect of a personalized presswork printed at the server can be kept consistent with the effect of displaying the text block on the screen.

9 Claims, 4 Drawing Sheets

METHODS AND APPARATUSES FOR DISPLAYING TEXT BLOCK AND PROCESSING TEXT BLOCK

The present application claims priority to Chinese Patent Application No. 201310336633.5 filed on Aug. 5, 2013, which is hereby incorporated by reference in its entirety.

FIELD OF THE INVENTION

The present invention relates to the technical field of personalized printing and particularly to a method for displaying a text block, a method for processing a text block, a client and a server.

BACKGROUND OF THE INVENTION

It is necessary in the process of customizing a personalized presswork to edit a text in software of a client, for example, by modifying the font, the word size, the color and the layout of the text, and then preview an edition result and judge whether the edited text reaches a desirable effect, and if so, then transmit the edited text to a server which generates an electronic document for use in printing so that the personalized presswork is printed according to the electronic document.

In the foregoing process of generating the personalized presswork, the difference between software environments of the client and the server may result in the difference between the effect of displaying the text at the client and the effect of displaying the text in the electronic document generated at the server. For example, a variety of fonts may need to be used in editing the text in the software of the client, but some of the fonts may be absent at the server, so that the effect of displaying the text in the generated electronic document may be different from the effect of displaying the text at the client or there may be an error in generation of the electronic document at the server, thus resulting in the difference between the printed personalized presswork and the effect of displaying the text at the client.

SUMMARY OF THE INVENTION

Embodiments of the invention provide a method for displaying a text block, a method for processing a text block, a client and a server, so as to address the problem in the prior art of the difference between the printed personalized presswork and the effect of displaying the text at the client.

A method for displaying a text block according to an embodiment of the invention includes:

collecting, by a client, font parameters and layout parameters of a text block;

transmitting, by the client, the font parameters and the layout parameters of the text block to a server; and receiving, by the client, vector description information of the text block, generated according to the font parameters and the layout parameters of the text block, sent from the server, and executing drawing commands to draw the text block and display the text block on a screen.

A method for processing a text block according to an embodiment of the invention includes:

receiving, by a server, font parameters and layout parameters of a text block transmitted from a client;

generating, by the server, vector description information of the text block according to the received font parameters and layout parameters of the text block; and sending, by the server, the vector description information of the text block to the client.

A client according to an embodiment of the invention includes:

a collecting unit configured to collect font parameters and layout parameters of a text block;

a transmitting unit configured to transmit the font parameters and the layout parameters of the text block to a server; and a drawing command executing unit configured to receive vector description information of the text block, generated according to the font parameters and the layout parameters of the text block, sent from the server, and to execute drawing commands to draw the text block and display the text block on a screen.

A server according to an embodiment of the invention includes:

a receiving unit configured to receive font parameters and layout parameters of a text block transmitted from a client;

a vector description information generating unit configured to generate vector description information of the text block according to the received font parameters and layout parameters of the text block; and a sending unit configured to send the vector description information of the text block to the client.

In the embodiments of the invention, a text block is drawn by using drawing commands, and vector description information of the text block is sent to a client, and the client draws the text block according to the vector description information of the text block and further displays the drawn text block on a screen, thus keeping a personalized presswork printed at a server consistent with the effect of displaying the text block on the screen.

DETAILED DESCRIPTION OF THE EMBODIMENTS

In order to address the problem of the difference between a printed personalized presswork and the effect of displaying a text at a client, embodiments of the invention provide a method and apparatus for displaying a text block. In the embodiments of the invention, a text block is drawn by using drawing commands, and vector description information of the text block is sent to a client, and the client draws the text block according to the vector description information of the text block and further displays the drawn text block on a screen, thus keeping a personalized presswork printed at a server consistent with the effect of displaying the text block on the screen.

The embodiments of the invention will be further described below with reference to the drawings.

Figure 1:
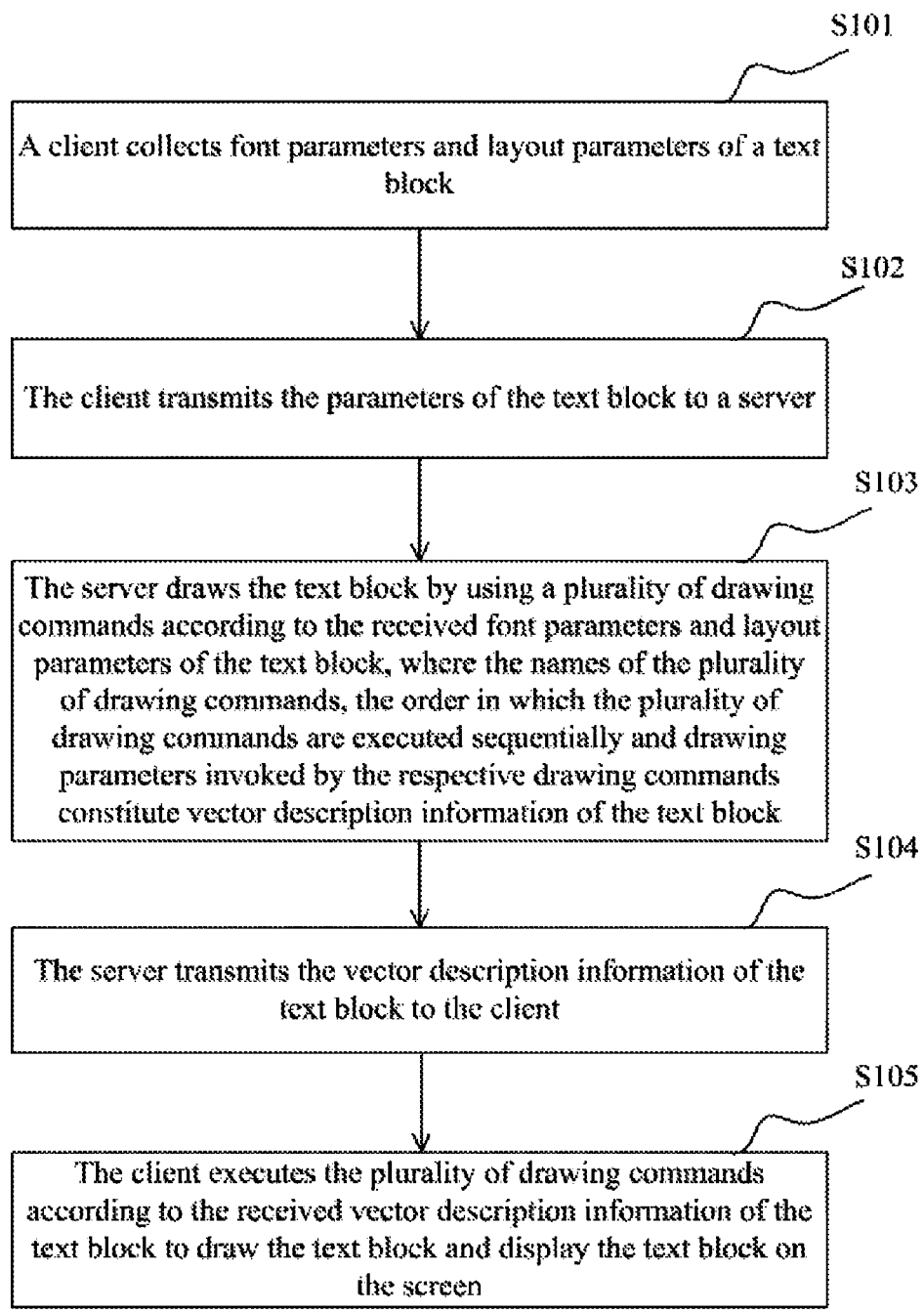
FIG. 1 is a flow chart of a method for displaying a text block according to an embodiment of the invention.

As illustrated in FIG. 1, a method for displaying a text block according to an embodiment of the invention includes the following steps:

S101. A client collects font parameters and layout parameters of a text block.

The text block described in the embodiment of the invention is one or more segments of texts displayed on a screen.

S102. The client transmits the font parameters and the layout parameters of the text block to a server.

S103. The server draws the text block by using a plurality of drawing commands according to the received font parameters and layout parameters of the text block, where the names of the plurality of drawing commands, the order in which the plurality of drawing commands are executed sequentially and drawing parameters invoked by the respective drawing commands constitute vector description information of the text block.

S104. The server transmits the vector description information of the text block to the client.

S105. The client executes the plurality of drawing commands according to the received vector description information of the text block to draw the text block and display the text block on the screen. The server prints the drawn text block to thereby obtain a personalized presswork. As can be apparent, the effect of displaying the text block on the screen at the client will be kept consistent with the effect of the personalized presswork.

The client collects the font parameters and the layout parameters of the text block, and particularly the font parameters of the text block collected by the client include a name, size, color, bold or not, italic or not and underline or not of a text font;

The layout parameters of the text block collected by the client include the width of the text block, the height of the text block, the row spacing of the text block, horizontal and vertical alignment patterns, the line spacing, the first line indent distance and the contents of the text block.

The client transmits the parameters of the text block to the server, and preferably the client firstly converts the parameters of the text block into an XML data format or another data format for convenient transmission and parsing and then transmits the parameters of the text block to the server. For example, the parameters of the text block are transported to the server over the Internet in the HTTP protocol or another Internet communication protocol.

Preferably after receiving the parameters of the text block, the server converts the parameters of the text block into an internal data structure which can be understood and processed at the server, and stores the internal data structure in the computer memory of the server.

The server draws the text block by using the plurality of drawing commands according to the received font parameters and layout parameters of the text block, where the names of the plurality of drawing commands, the order in which the plurality of drawing commands are executed sequentially and the drawing parameters invoked by the respective drawing commands constitute the vector description information of the text block; and particularly the server can invoke a drawing module in which the text block is drawn by using a straight line drawing command, curve drawing commands (including a conic curve drawing command and a cubic curve drawing command), a shape filling command, a color drawing command, a line shape drawing command and an image transforming mode command, for example, the drawing module draws the text in the text block by using the straight line drawing command and the curve drawing commands; and the drawing module records the names of the plurality of drawing commands, the order in which the plurality of drawing commands are executed sequentially and the drawing parameters invoked by the respective drawing commands to thereby obtain the vector description information of the text block and then transmit the vector description information of the text block to the server.

Preferably the server encodes and compresses the vector description information of the text block and then transmits the encoded and compressed vector description information of the text block to the client; and particularly the server encodes and compresses the vector description information of the text block in the following steps:

The name of each drawing command is encoded to shorten the length of the name of each drawing command.

One or two decimal places of floating point data in the vector description information of the text block are retained to obtain simplified floating point data; and since the vector description information of the text block includes a lot of high-precision floating point data, but the client is limited in display precision, the high-precision floating point data may not be necessary here, and one or two decimal places of the high-precision floating point data can simply be retained while the redundant decimal places can be omitted.

The simplified floating point data is converted into decimal integer data by being multiplied with a fixed coefficient, and particularly, when the simplified floating point data has one decimal place, the fixed coefficient can be an integer multiple of 10, and when the simplified floating point data has two decimal places, the fixed coefficient can be an integer multiple of 100; and further the decimal integer data is converted into hexadecimal data to thereby further shorten the data length. The vector description information of the text block is encoded and compressed as described above to thereby accelerate transmission of the vector description information of the text block to the client.

The client decodes and decompresses the encoded and compressed vector description information of the text block and then executes the plurality of drawing commands according to the vector description information of the text block.

Particularly the client decodes and decompresses the vector description information of the text block in the following steps:

The received name of each drawing command is decoded to thereby recover the name of each drawing command; and The received hexadecimal data is converted into the decimal integer data, and the decimal integer data is divided by the fixed coefficient to thereby obtain the simplified floating point data.

The client executes the plurality of drawing commands according to the received vector description information of the text block to draw the text block and display the text block on the screen. Particularly the client invokes the drawing module to execute the plurality of drawing commands; and the server prints the drawn text block to thereby obtain the personalized presswork. As can be apparent, the effect of displaying the text block on the screen at the client will be kept consistent with the effect of the personalized presswork.

Figure 2:
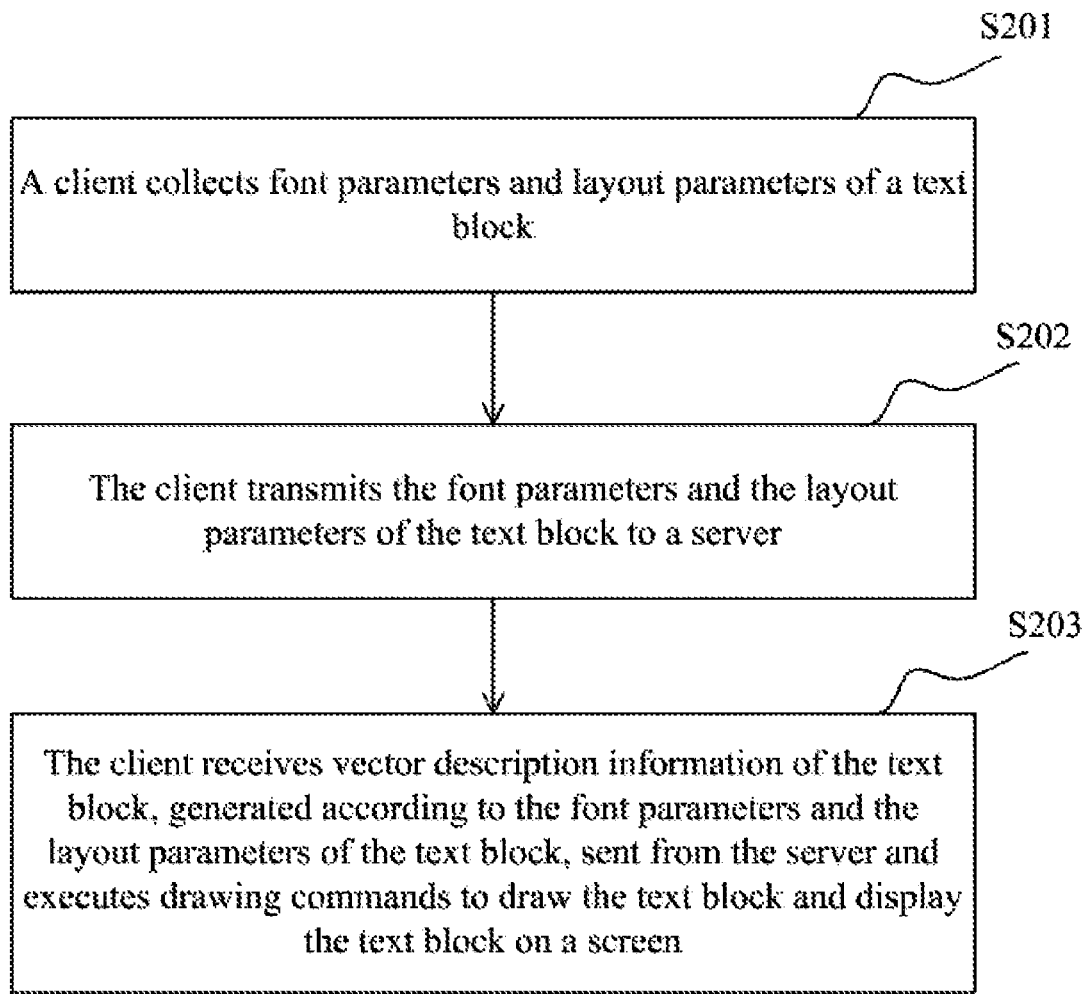
FIG. 2 is a flow chart of a method for displaying a text block at a client according to an embodiment of the invention.

In summary, referring to FIG. 2, a method for displaying a text block at a client according to an embodiment of the invention includes the following steps:

S201. A client collects font parameters and layout parameters of a text block;

S202. The client transmits the font parameters and the layout parameters of the text block to a server; and S203. The client receives vector description information of the text block, generated according to the font parameters and the layout parameters of the text block, sent from the server and executes drawing commands to draw the text block and display the text block on a screen.

Preferably the client encodes the font parameters and the layout parameters of the text block and then transmits the encoded font parameters and layout parameters of the text block to the server.

Preferably the font parameters of the text block include a name, size, color, bold or not, italic or not and underline or not of a text font; and The layout parameters of the text block include the width of the text block, the height of the text block, the row spacing of the text block, horizontal and vertical alignment patterns, the line spacing, the first line indent distance and the contents of the text block.

Figure 3:
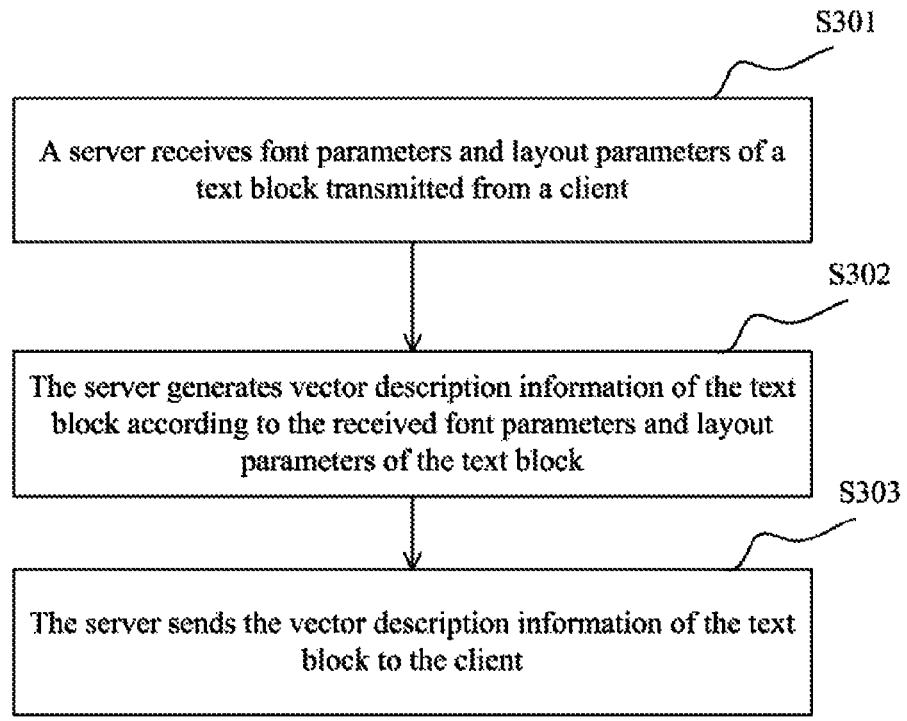
FIG. 3 is a flow chart of a method for processing a text block at a server according to an embodiment of the invention.

Referring to FIG. 3, a method for processing a text block at a server according to an embodiment of the invention includes the following steps:

S301. A server receives font parameters and layout parameters of a text block transmitted from a client;

S302: The server generates vector description information of the text block according to the received font parameters and layout parameters of the text block; and S303: The server sends the vector description information of the text block to the client.

Preferably the server generates the vector description information of the text block according to the received font parameters and layout parameters of the text block particularly as follows:

The server generates a graphic drawing interface layer; and

The server invokes the graphic drawing interface layer to draw the text block, and records used interface invocation sequences and corresponding invocation parameters sequentially in the drawing process to obtain the vector description information of the text block.

Preferably the server encodes and compresses the vector description information of the text block and then sends the encoded and compressed vector description information of the text block to the client.

Preferably the server encodes and compresses the vector description information of the text block particularly in the following steps:

The name of each drawing command is encoded to shorten the length of the name of each drawing command;

One or two decimal places of floating point data in the vector description information of the text block is retained to obtain simplified floating point data; and The simplified floating point data is converted into decimal integer data by being multiplied with a fixed coefficient, and then the decimal integer data is converted into hexadecimal data.

The client decodes and decompresses the vector description information of the text block particularly in the following steps:

The received name of each drawing command is decoded to thereby recover the name of each drawing command; and The received hexadecimal data is converted into the decimal integer data, and the decimal integer data is divided by the fixed coefficient to thereby obtain the simplified floating point data.

Preferably the font parameters of the text block include a name, size, color, bold or not, italic or not and underline or not of a text font; and The layout parameters of the text block include the width of the text block, the height of the text block, the row spacing of the text block, horizontal and vertical alignment patterns, the line spacing, the first line indent distance and the contents of the text block.

Figure 4:
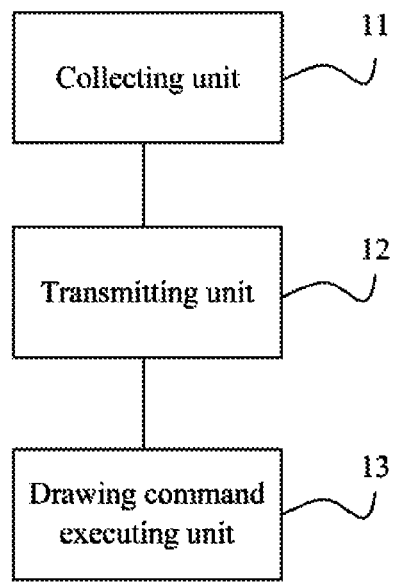
FIG. 4 is a schematic structural diagram of a client according to an embodiment of the invention.

Referring to FIG. 4, a client according to an embodiment of the invention includes:

A collecting unit 11 configured to collect font parameters and layout parameters of a text block;

A transmitting unit 12 configured to transmit the font parameters and the layout parameters of the text block to a server; and A drawing command executing unit 13 configured to receive vector description information of the text block, generated according to the font parameters and the layout parameters of the text block, sent from the server, and to execute drawing commands to draw the text block and display the text block on a screen.

Preferably the transmitting unit 12 encodes the font parameters and the layout parameters of the text block and then transmits encoded font parameters and layout parameters of the text block to the server.

Preferably the font parameters of the text block include a name, size, color, bold or not, italic or not and underline or not of a text font; and The layout parameters of the text block include the width of the text block, the height of the text block, the row spacing of the text block, horizontal and vertical alignment patterns, the line spacing, the first line indent distance and the contents of the text block.

Figure 5:
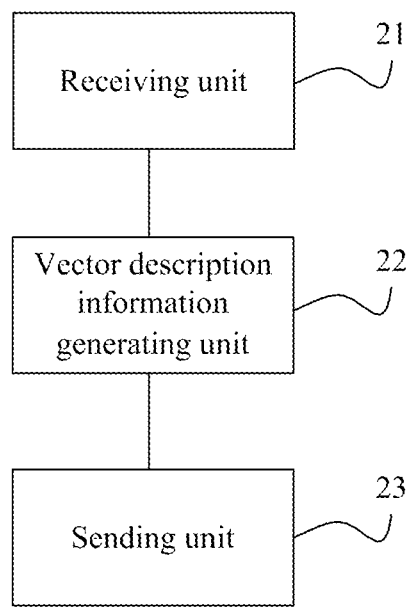
FIG. 5 is a schematic structural diagram of a server according to an embodiment of the invention.

Referring to FIG. 5, a server according to an embodiment of the invention includes:

A receiving unit 21 configured to receive font parameters and layout parameters of a text block transmitted from a client;

A vector description information generating unit 22 configured to generate vector description information of the text block according to the received font parameters and layout parameters of the text block; and A sending unit 23 configured to send the vector description information of the text block to the client.

Preferably the vector description information generating unit 22 is specifically configured to generate a graphic drawing interface layer; and to invoke the graphic drawing interface layer to draw the text block, and to record used interface invocation sequences and corresponding invocation parameters sequentially in the drawing process to obtain the vector description information of the text block.

Preferably the sending unit 23 encodes and compresses the vector description information of the text block and then sends encoded and compressed vector description information of the text block to the client.

Preferably the sending unit 23 is specifically configured:

To encode a name of each drawing command to shorten length of the name of each drawing command;

To retain one or two decimal places of floating point data in the vector description information of the text block to obtain simplified floating point data; and To convert the simplified floating point data into decimal integer data by multiplying the simplified floating point data with a fixed coefficient, and then convert the decimal integer data into hexadecimal data.

The client is configured to decode and decompress the vector description information of the text block, and specifically configured:

To decode the received name of each drawing command to recover the name of each drawing command; and To convert the received hexadecimal data into the decimal integer data, and divide the decimal integer data by the fixed coefficient to obtain the simplified floating point data.

Preferably the font parameters of the text block include a name, size, color, bold or not, italic or not and underline or not of a text font; and The layout parameters of the text block include the width of the text block, the height of the text block, the row spacing of the text block, horizontal and vertical alignment patterns, the line spacing, the first line indent distance and the contents of the text block.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for displaying a text block, comprising:
collecting, by a client, font parameters and layout parameters of a text block;
transmitting, by the client, the font parameters and the layout parameters of the text block to a server; and
receiving, by the client, vector description information of the text block, generated according to the font parameters and the layout parameters of the text block, sent from the server, and executing drawing commands to draw the text block and display the text block on a screen;
wherein the vector description information of the text block is encoded and compressed by the server and then the client receives encoded and compressed vector description information of the text block sent from the server;
wherein the server encodes and compresses the vector description information of the text block specifically as follows:
encoding a name of each drawing command to shorten length of the name of each drawing command;
retaining one or two decimal places of floating point data in the vector description information of the text block to obtain simplified floating point data; and
converting the simplified floating point data into decimal integer data by multiplying the simplified floating point data with a fixed coefficient, and then converting the decimal integer data into hexadecimal data; and
the client decodes and decompresses the vector description information of the text block specifically as follows:
decoding the received name of each drawing command to recover the name of each drawing command; and
converting the received hexadecimal data into the decimal integer data, and dividing the decimal integer data by the fixed coefficient to obtain the simplified floating point data.

2. The method according to claim 1, wherein the client encodes the font parameters and the layout parameters of the text block and then transmits encoded font parameters and layout parameters of the text block to the server.

3. The method according to claim 1, wherein the font parameters of the text block include a name, size, color, bold or not, italic or not and underline or not of a text font; and
the layout parameters of the text block include width of the text block, height of the text block, row spacing of the text block, horizontal and vertical alignment patterns, line spacing, a first line indent distance and contents of the text block.

4. A method for processing a text block, comprising:
receiving, by a server, font parameters and layout parameters of a text block transmitted from a client;
generating, by the server, vector description information of the text block according to the received font parameters and layout parameters of the text block; and
sending, by the server, the vector description information of the text block to the client;
wherein the server encodes and compresses the vector description information of the text block and then sends encoded and compressed vector description information of the text block to the client;
wherein the server encodes and compresses the vector description information of the text block specifically as follows:
encoding a name of each drawing command to shorten length of the name of each drawing command;
retaining one or two decimal places of floating point data in the vector description information of the text block to obtain simplified floating point data; and
converting the simplified floating point data into decimal integer data by multiplying the simplified floating point data with a fixed coefficient, and then converting the decimal integer data into hexadecimal data; and
the client decodes and decompresses the vector description information of the text block specifically as follows:
decoding the received name of each drawing command to recover the name of each drawing command; and converting the received hexadecimal data into the decimal integer data, and dividing the decimal integer data by the fixed coefficient to obtain the simplified floating point data.

5. The method according to claim 4, wherein generating, by the server, the vector description information of the text block according to the received font parameters and layout parameters of the text block comprises:
generating, by the server, a graphic drawing interface layer; and
invoking, by the server, the graphic drawing interface layer to draw the text block, and recording used interface invocation sequences and corresponding invocation parameters sequentially in the drawing process to obtain the vector description information of the text block.

6. The method according to claim 4, wherein the font parameters of the text block include a name, size, color, bold or not, italic or not and underline or not of a text font; and
the layout parameters of the text block include width of the text block, height of the text block, row spacing of the text block, horizontal and vertical alignment patterns, line spacing, a first line indent distance and contents of the text block.

7. A client, comprising:
a collecting unit configured to collect font parameters and layout parameters of a text block;
a transmitting unit configured to transmit the font parameters and the layout parameters of the text block to a server; and
a drawing command executing unit configured to receive vector description information of the text block, generated according to the font parameters and the layout parameters of the text block, sent from the server, and to execute drawing commands to draw the text block and display the text block on a screen;
wherein the vector description information of the text block is encoded and compressed by the server and then the drawing command executing unit receives encoded and compressed vector description information of the text block sent from the server;
wherein the server encodes and compresses the vector description information of the text block specifically as follows:
encoding a name of each drawing command to shorten length of the name of each drawing command;
retaining one or two decimal places of floating point data in the vector description information of the text block to obtain simplified floating point data; and
converting the simplified floating point data into decimal integer data by multiplying the simplified floating point data with a fixed coefficient, and then converting the decimal integer data into hexadecimal data; and
the client decodes and decompresses the vector description information of the text block specifically as follows:
decoding the received name of each drawing command to recover the name of each drawing command; and
converting the received hexadecimal data into the decimal integer data, and dividing the decimal integer data by the fixed coefficient to obtain the simplified floating point data.

8. The client according to claim 7, wherein the transmitting unit encodes the font parameters and the layout parameters of the text block and then transmits encoded font parameters and layout parameters of the text block to the server.

9. The client according to claim 7, wherein the font parameters of the text block include a name, size, color, bold or not, italic or not and underline or not of a text font; and
the layout parameters of the text block include width of the text block, height of the text block, row spacing of the text block, horizontal and vertical alignment patterns, line spacing, a first line indent distance and contents of the text block.

* * * * *